Inventors:
Virgil L. Stout,
Nathan R. Whetten,
by Paul A. Frank
Their Attorney.

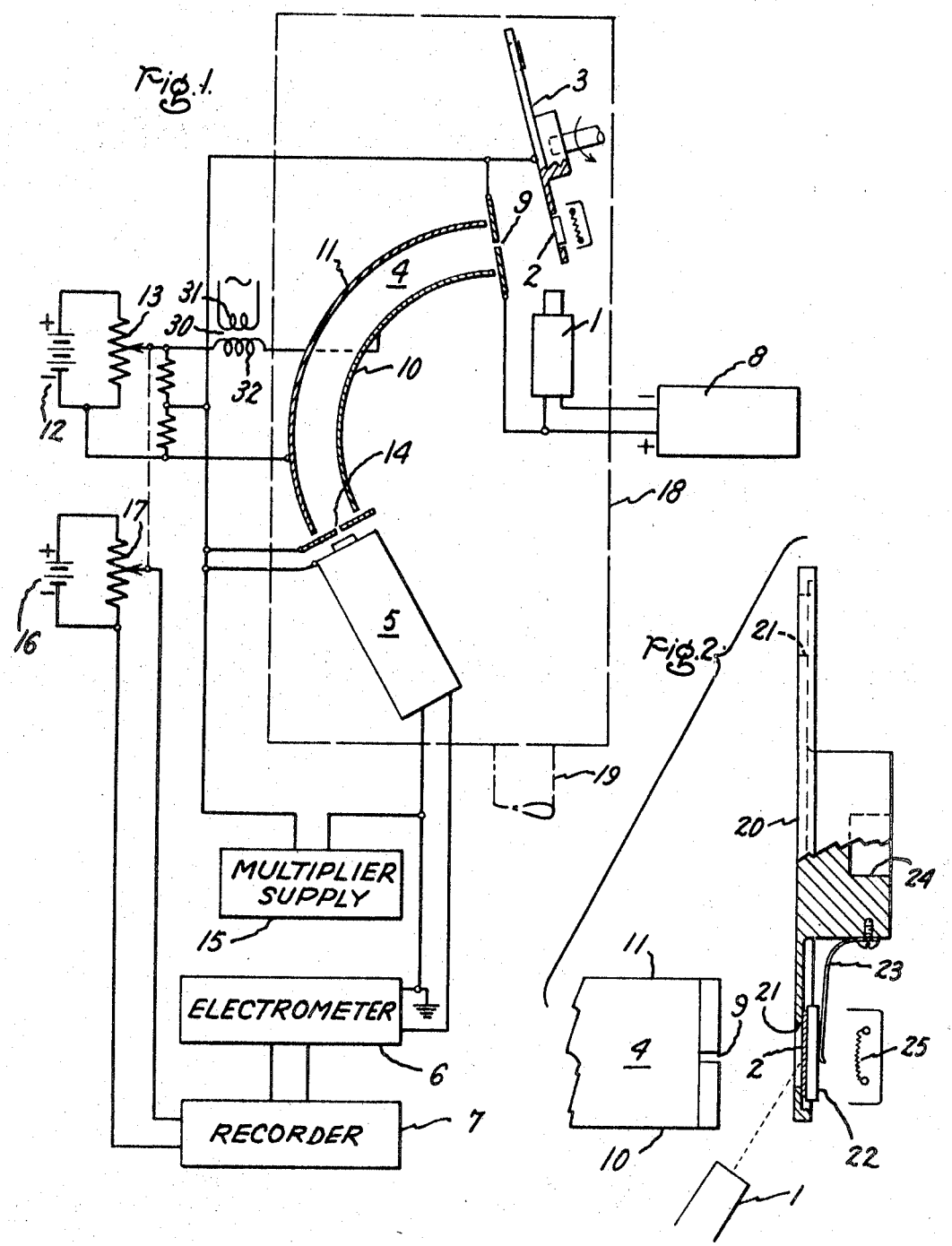

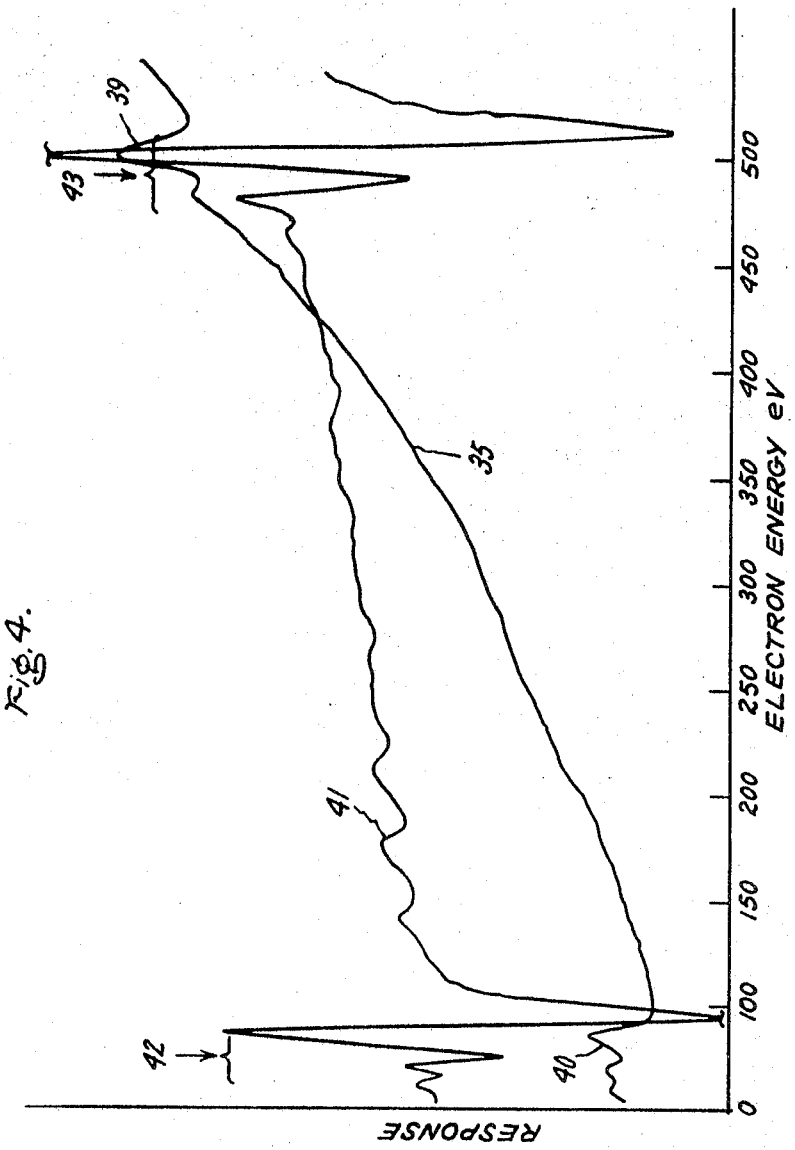

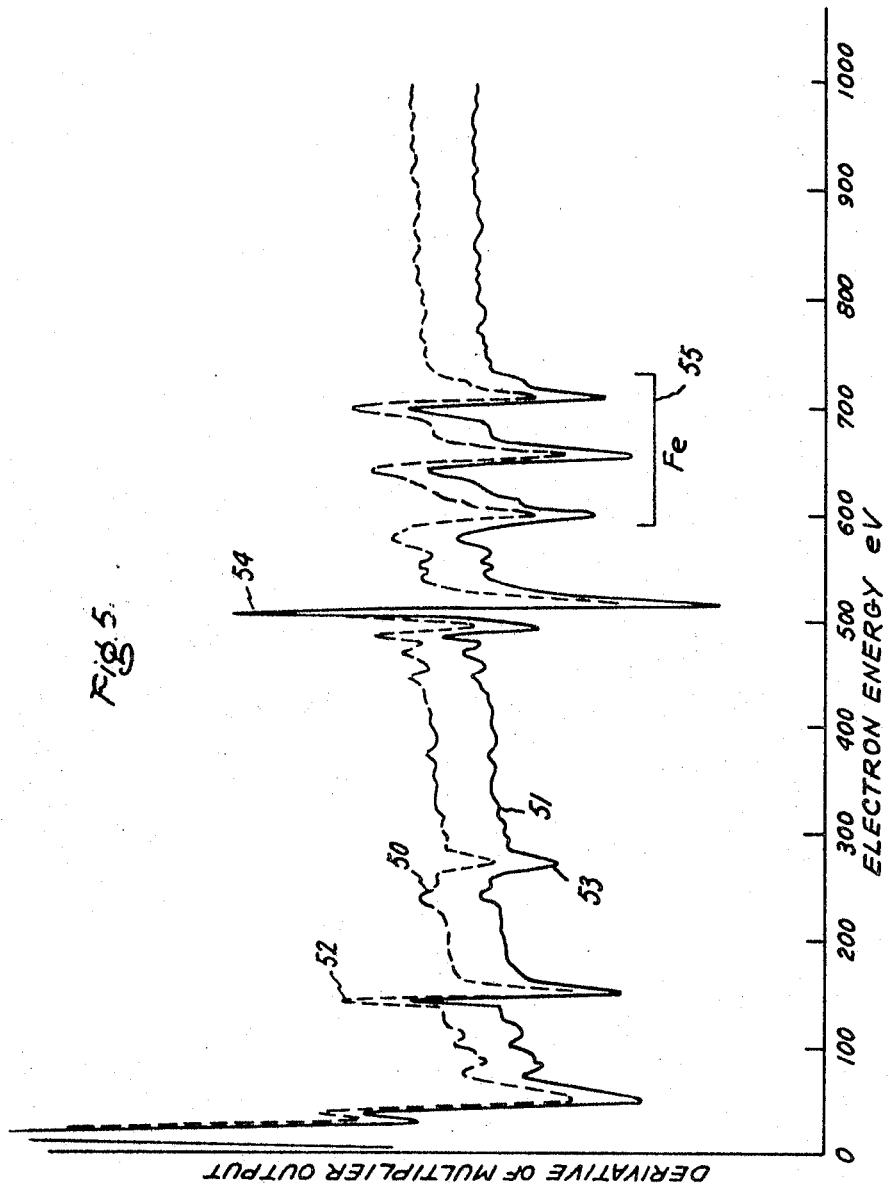

United States Patent Office 3,461,306
Patented Aug. 12, 1969

3,461,306
ELECTRON PROBE MICROANALYZER FOR
MEASURING THE DIFFERENTIAL ENERGY
RESPONSE OF AUGER ELECTRONS
Virgil L. Stout, Schenectady, and Nathan Rey Whetten, Burnt Hills, N.Y., assignors to General Electric Company, a corporation of New York
Filed Apr. 27, 1967, Ser. No. 634,214
Int. Cl. H01j 37/26
U.S. Cl. 250—49.5                                    8 Claims

ABSTRACT OF THE DISCLOSURE

The constituents of the surface layer of an object are determined from characteristic Auger electrons emitted when an electron beam irradiates the object. Auger electrons as well as other secondary emission electrons are translated through a sector analyzer to an electron multiplier and a recorder. An alternating current field is superimposed on the D-C field of a conventional sector analyzer so that the rate of change in number of electrons per unit energy interval is recorded as the D-C field is varied. The rapid fluctuations in the output of the multiplier are detected in synchronism with the change in the field. The structure thus obtained in the differentiated energy distribution curve identifies the Auger electrons and the elements in the surface layer in which they originate.

Our invention relates to the apparatus for electron microanalysis and in particular to apparatus using Auger electrons for determining the constituent materials of an object being studied or examined by an irradiating electron beam.

Electron bombardment of a material results in ionization of the inner orbits of some of its atoms and the occurrence of one of two phenomena. The first is that X-rays may be produced when an electron makes the transition from a higher energy level to the ionized inner orbit level. The second phenomenon is that the energy may be transferred to another of the higher level electrons, ejecting it from the atom without the emission of electromagnetic radiation. The electrons emitted by this radiationless process are called Auger electrons. Of course, along with both phenomena undesired background noise, secondary electrons, and plasma loss electrons are also present.

The energy released in either process is characteristic of the excited atom. X-rays emitted with these characteristic energies have long provided a standard means of analyzing materials. J. J. Lander, in Physical Review, vol. 91, page 1382 (1953) has discovered how the measurement of Auger electron energies may be useful for analytical purposes. Also, G. A. Harrower, in Physical Review, vol. 102, page 340 (1956) has described some apparatus suitable for measuring the energies of secondary emission electrons. Such apparatus included a 127° sector electron analyzer and a recording milliammeter to record the incidence of secondary emission electrons as the voltage applied to the electrodes of the analyzer was slowly swept over a range of voltages.

One of the problems of the type of apparatus heretofore used for detecting and measuring the energies of Auger electrons is that while the information provided included excellent records of reflected primary electrons, as well as records of plasma oscillations of valence electrons, background noise submerged the records of Auger electrons. It would be desirable, therefore, to be able to selectively pick out Auger electrons for analytical purposes while suppressing undesired secondary electrons, primary electrons, plasma loss electrons, and background noise.

It is a primary object of our invention to provide new and improved apparatus to determine the constituent materials of an object by the energy of the Auger electrons emitted when an electron beam irradiates the surface.

It is still another object of our invention to provide an electron microanalyzer which selectively accentuates the currents of Auger electrons while diminishing records of primary electrons, secondary electrons, and background noise.

It is another object of our invention to provide apparatus for analyzing the surface of materials which is particularly sensitive to the detection of materials of low atomic number.

Still another object of our invention is to provide apparatus for detecting contaminating surface materials.

In its broadest aspect, our invention consists in providing, in apparatus for selectively analyzing Auger electrons, circuits which permit observing the derivative of the energy distribution curve with respect to energy itself. Secondary electrons, including Auger electrons emitted from a surface irradiated with a beam of primary electrons are subjected to fields which differentiate not only between electrons of different energies, but also in the rate of change of electron emission as a broad energy range is scanned. The apparatus employed subjects Auger and other secondary electrons to both a unidirectional field, so that they may be selected in accordance with energy, and a time-varying field so that the rate of change of emission of electrons is determined with rsepect to each energy level.

The subject mater which we regard as our invention is particularly pointed out and distinctly claimed in the concluding portion of this specification. The invention, however, both as to organization and method of operation, together with further objects and advantages thereof may best be understood by reference to the following description taken in connection with the accompanying drawings wherein like reference characters refer to like elements and in which FIGURE 1 is a schematic representation of the apparatus of our invention.

FIGURE 2 is an enlarged view of a sample holder embodied in the apparatus of FIGURE 1.

FIGURE 4 shows two curves illustrating two modes of operating the apparatus of FIGURE 1, and FIGURE 5 shows two curves that are derivatives of the energy distribution obtained with the use of the apparatus of FIGURE 1.

Figure 3:
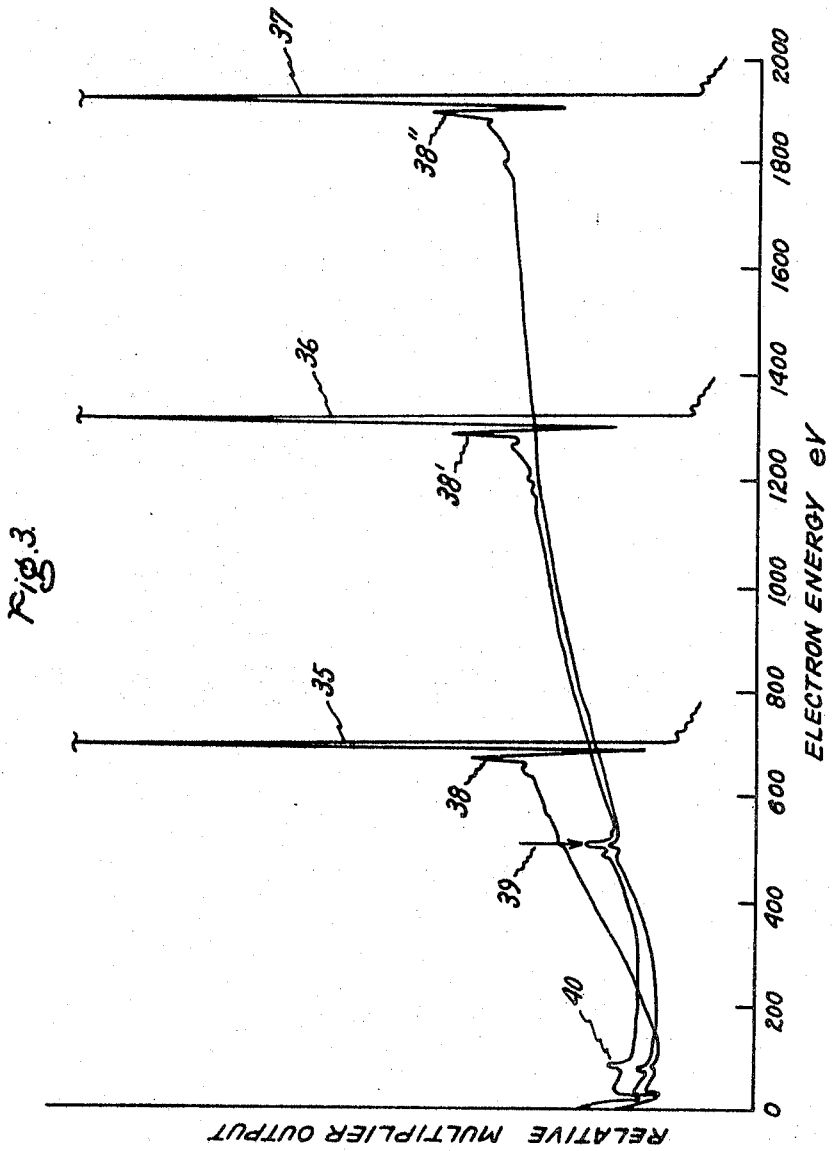
FIGURE 3 shows three curves illustrating one mode of operating the apparatus of FIGURE 1.

The Auger electron microanalyzer of FIGURE 1 comprises an electron gun 1 which directs a beam of electrons to irradiate an object 2, supported on a sample holder 3, and from which Auger electrons and other secondary electrons are emitted. The remaining elements of the microanalyzer comprise an electron energy analyzer 4, and electron multipler 5, and an electrometer 6, the output of which is supplied to a conventional recorder 7.

The electron gun may be of any suitable type and preferably has a tungsten or other low vapor pressure emitter to minimize evaporation from the emitter onto the sample and to allow repeated exposure to air. Operating potentials for the electron gun are provided from a power supply 8. The output of gun 1, that is, the beam of primary electrons, is directed onto sample 2 so that it strikes the sample at a relatively small angle. Because of this grazing incidence, the spot of the electron beam is elongated in the direction of the beam. Alternatively, of course, a more complex gun and sweep arrangement can be provided to scan the sample in a well-known manner.

Auger electrons and secondary electrons emitted from the sample 2 enter the electron analyzer 4 through a narrow slit 9, the edges of which are maintained at a positive potential by connection to a power supply 8. The analyzer 4 is conventional in form and includes a pair of soft iron electrodes or poles 10, 11 insulated from each other and across which a unidirectional field is established by connections to a unidirectional power supply 12. The voltage impressed between electrodes 10, 11 may be varied by means of potentiometer 13. Preferably the entire analyzer is made of soft iron and demagnetized to insure that the long electron path through the 127° sector analyzer is unaffected by magnetic fields.

After traversing the curved path through analyzer 4, Auger electrons and other secondary electrons exit through a second slit 14 to strike the dynode of conventional electron multiplier 5, whose output currents are supplied through electrometer 6 to the conventional pen-type recorded 7 which displays the measured energy spectra. Operating potentials for electron multiplier 5 are obtained from a multiplier supply 15 which is connected in series with primary power supply 8. In this manner, electron gun 1, slots 9 and 14, sample 2, and electron analyzer 4 are all below ground potential by the value of the multiplier supply voltage.

Operating potential for recorder 7 is provided by an additional power supply 16 across which is connected a potentiometer 17. Preferably, potentiometer 13, and potentiometer 17 are ganged-connected and driven by a synchronous motor (not shown) so that the position of the recorder pen varies with the potential applied across electrodes 10, 11. In operation the voltage applied to electrodes 10, 11 is slowly swept across its range in a period of between three and five minutes, depending upon the range of constituent materials to be investigated.

The entire apparatus thus described is enclosed in a suitable housing 18 which is evacuated through an opening 19 by means of conventional vacuum pumps (not shown). Properly trapped mechanical pumps, mercury diffusion pumps, sublimation pumps, or ion pumps may be employed.

FIGURE 2 shows the sample holder employed in the apparatus of FIGURE 1 which comprises a sample wheel 20 having a plurality of apertures 21 behind which are positioned the samples, each sample being mounted behind an aperture or hole 21 as on a clock face. Each of the samples is maintained in position by means of a plate 22 made of suitable material such as molybdenum and which is engaged by spring finger 23. This arrangement insures that the active surfaces of the samples are in a common plane and may be placed in the same relative position with respect to the analyzer and gun as sample wheel 20 is turned on the bearing surface 24 to change samples. Any suitable shaft for supporting and rotating sample wheel 22 may be inserted into bearing surface 24 for this purpose. Supported behind the sample being examined is a heater 25 energized from any suitable source of electrical potential (not shown) and which permits heating the molybdenum plate 22 and its supported sample by electron bombardment.

In the operation of our apparatus the analyzer selects electrons in accordance with the energy, the selection being determined by the voltage applied across the spaced electrodes 10, 11. In accordance with our invention we operate the analyzer in two different modes, the first being when a unidirectional potential alone is applied between electrodes 10, 11, and the second when a low voltage relatively high frequency perturbation is superimposed on the direct current voltage and applied to the electrodes. This high frequency or time-varying potential is obtained from a transformer 30, having its secondary winding 32 connected in series between electrode 10 and the variable tap on potentiometer 13. Primary winding 32 has an alternating or time-varying potential having a frequency of, for example, 7 kilohertz applied to its input terminals from any suitable source (not shown).

In either mode of operation the voltage applied to electrodes 10, 11 is slowly swept across its complete range by the motor which moves the variable tap on potentiometer 13. The same motor drives the variable tap on potentiometer 17 so that movement of recorder 7 is synchronized with variation of voltage across electrodes 10, 11. We have found that usually the energy scan can be accomplished in between three to five minutes, depending upon the response characteristic of the electron multiplier and its associated circuits.

FIGURE 3 is a graph illustrating the energy distribution curves obtained when a beryllium sample is excited by electron beams from gun 1 of three different energies. Curve 35 was obtained when the energy of the gun or primary electron beam was 695 electron volts. Curve 36 was obtained when the energy was 1310 electron volts, and curve 37 when the primary electron beam had a potential of 1910 electron volts. The final sharp peak on each of these curves is due to the reflected primary electrons and serves the useful purpose of calibrating the energy scale. The peaks labeled 38, 38' and 38" of the respective curves 35, 36, 37 are caused by electrons that have excited plasma oscillations within the sample and have lost the energy required to excite these oscillations. The point of occurrance of these particular peaks in the curves, which help to determine the density of valence electrons in the sample, is dependent upon the atoms present in the sample and on their chemical and physical arrangement. The two peaks labeled respectively 39 and 40 are the Auger electron peaks from oxygen and beryllium respectively. These occur at energies characteristic of the material and are independent of the energy of the primary electron beam. The curves of FIGURE 3 were all obtained using only unidirectional potential across electrodes 10, 11, and indicate that when operating in this mode, peaks 39, 40 appear as very small peaks superimposed upon a relatively large background.

FIGURE 4 illustrates vividly the difference in response obtained when, in accordance with our invention, in addition to applying a unidirectional voltage across electrodes 10, 11, a time-varying voltage is superimposed on such unidirectional voltage. In FIGURE 4 the curve labeled 35 is an enlarged version of the left-hand portion of curve 35 of FIGURE 3. In contrast, curve 41 illustrates the response of the analyzer when differentiation is employed to emphasize the Auger electron peaks by showing the rate of change of electrons translated over the curved path within analyzer 4 as the strength of the unidirectional field between electrons 10, 11 is varied. Region 42 of curve 41 shows the rate of change or derivative of the distribution curve 35, i.e., the peak 40 of curve 35. Similarly, region 43 of curve 41 shows the derivative of the peak 39 of curve 35 which is the response in the distribution curve due to the presence of oxygen in the material. By comparison of the two curves the marked increase in sensitivity for the surface material being studied is apparent. It is well known that the sensitivity of an electron analyzer of the type illustrated is a linear function of the electron energy so that low energy electrons tend to be obscured particularly by noise. We have found that differentiation not only suppresses noise but helps to restore the loss of sensitivity with decreasing energy inherent in an analyzer. Auger electrons produced by the primary beam excitation have less energy than do the primary electrons. The differentiated spectra curve 41 shows much fine structure which is not readily distinguishable in curve 35.

FIGURE 5 illustrates that the fluctuations observed by our apparatus are real and reproducible. Thus, this figure shows a pair of differentiated spectra taken at different times from steel using the same values of primary electron energy. Curve 50 was displaced vertically from curve 51 in order to make identification of the individual features easier. In these curves the peaks 52 are due to presence of sulfur in the sample; the peaks 53 correspond to the carbon present in the sample; and the peaks 54 to the oxygen in the sample. The portion of the two curves marked with the numeral 55 indicate the response typically obtained for heavier elements and correspond to the different electron energy levels found in the more complex or heavier elements.

One of the advantages of our apparatus is that because an examination is made only of the outer or superficial layer of the sample, the apparatus is useful for detecting contamination, surface migration or segregation, and diffusion studies. For accurate qualitative analysis of the specimen being examined, it is desirable that the surface be as clean as possible. When the energy of the primary electrons of electron gun 1 is of the order of several kilovolts, the electron penetration is in the range of hundreds of angstroms to perhaps 1000 angstroms, depending upon the material. To have reasonable efficiency, the primary electrons should have several times the energy necessary to ionize the inner shells. However, Auger electrons can escape from the surface with their full characteristic energy only if they originate within less than a few tens of angstroms of the surface. Therefore, the effective range of electrons in which they can produce appreciable Auger emission is confined to the surface layer or a very small distance below the surface. Accordingly, our method of analysis is particularly sensitive to contamination of the sample surface.

In preparing samples for examination, it is most desirable that they be cleaned and degreased with the utmost care. However, we have found that samples cleaned with the usual organic solvents invariably display evidence of organic residues. In order to provide more effective cleaning of the surface, we have employed a cleaning method which comprises sputtering the surface with argon positive ions. In this method, a small amount of an inert gas, such as argon, is introduced into the vacuum system and a glow discharge is established between the chamber wall as an anode and a large titanium strip (not shown) positioned within the evacuated region as cathode. This discharge is allowed to continue for several minutes to clean up the active impurities in the gas. The potential of the sample holder 3 is then depressed below that of the anode by several hundred volts to allow positive ions to strike the sample. This sputtering treatment is effective to remove organic films and bring out the features due to the sample material itself.

Additional cleaning is effected by heating the samples from the back by electron bombardment, using the heater 25 to obtain temperatures up to about 1000° C. We have found that the combination of heating and sputtering removes not only any organic residue but also any carbon deposit which remains after the heating step.

We have found that analysis of the Auger emission is a sensitive indicator of the components on a surface. By means of our analysis, residues from organic cleaning solvents have been identified and the formation of carbonaceous or carbide layers on materials etched with organic etchants have likewise been demonstrated. The method is particularly suited to the detection of light elements not readily detected by other means and to the study of extremely thin layers of the surface of solids. The system is particularly useful for the study of surface segregation, surface contamination, and other surface connected effects, as well as for the study of diffusion in solids.

Our apparatus provides many advantages over the use of the presently available devices which use characteristic X-rays to identify elements. Among these advantages are the simplicity of the detection apparatus as compared to X-ray techniques and consequently in cost and in time required for analysis and the sensitivity to low atomic number materials which is not available with X-ray analysis. Thus, our apparatus is much more adapted to analysis of surface materials than are X-ray techniques. Energy analysis using our method involves only sweeping the voltage on the analyzer.

Although a specific embodiment of the invention has been shown and described, it will be appreciated that it is but illustrative and that various modifications may be made without departing from tthte scope and spirit of this invention as defined in the appended claims.

What we claim as new and desire to secure by Letters Patent of the United States is:

1. Apparatus for determining the constituents of the surface layer of an object comprising
   means for irradiating such surface with a beam of electrons,
   analyzing means for receiving Auger electrons and other secondary electrons emitted from such surface and translating them over a curved path to electron flow indicating means, said analyzing means comprising
      means establishing a unidirectional electric field throughout such curved path,
      means for varying the intensity of the unidirection field, and
      means superimposing a time-varying electric field on such unidirectional field whereby the rate of change in the number of electrons translated over said path as a function of field intensity and the energy of electrons emitted from the different constituent elements of the surface being examined are indicated by said electron flow indicating means as the unidirectional field strength is varied.

2. The apparatus of claim 1 in which said electron flow indicating means comprises a recorder, and an electron multiplier is connected between said analyzing means and said recorder.

3. The apparatus of claim 2 in which the output of said multiplier is detected synchronously with the variations in said time-varying field.

4. Apparatus for analyzing materials comprising
   means defining an evacuated region,
   a support for material to be analyzed positioned in said region,
   electron gun means for irradiating such material whereby Auger electrons and other secondary electrons are emitted therefrom,
   an electron analyzer positioned adjacent said support for receiving emitted electrons and translating them over a curved path, said analyzer comprising
      spaced electrodes and means for impressing a unidirectional voltage across said electrodes to establish an electric field along said path;
   means for varying the intensity of such voltage whereby at each value of voltage electrons of a given energy traverse said path while electrons of different energy are deflected to said electrodes, and
   means for determining the rate of change of flow of electrons over said path as the intensity of the unidirectional voltage is varied.

5. The apparatus of claim 4 in which the means for determining the rate of change includes
   means for applying a high frequency voltage across said electrodes.

6. The apparatus of claim 5 in which an electron multiplier and a recorder are connected to receive electrons from said analyzer and said recorder is synchronized with said voltage varying means.

7. The apparatus of claim 4 which includes means for heating material to be analyzed.

8. The apparatus of claim 4 which includes a small amount of inert gas in said region,
   means for ionizing such gas, and means for applying a negative voltage to the material to be analyzed to cause such ions to strike the material.

References Cited
UNITED STATES PATENTS
| | | | |
|---|---|---|---|
| 2,405,306 | 8/1946 | Hillier et al. | 250—49.58 |
| 3,307,035 | 2/1967 | Grasenick | 250—49.52 |
| 3,356,844 | 12/1967 | Haubart | 250—49.52 |

OTHER REFERENCES

Harrower: "Auger Electron Emission in the Energy Spectrum of Secondary Electrons from Ma and W," Physical Review, vol. 102, No. 2, April 1956, pp. 340–347.

Smythe: "A New Mass. Spectrometer," Physical Review, vol. 40, May 1, 1932, pp. 429–433.

RALPH G. NILSON, *Primary Examiner.*

C. CHURCH, Assistant Examiner